March 3, 1931. F. N. CONNET 1,795,250
APPARATUS FOR OBTAINING THE RATIO BETWEEN TWO VARIABLES,
PARTICULARLY ADAPTED FOR METERING VISCOUS FLUIDS
Filed July 11, 1927 2 Sheets-Sheet 2
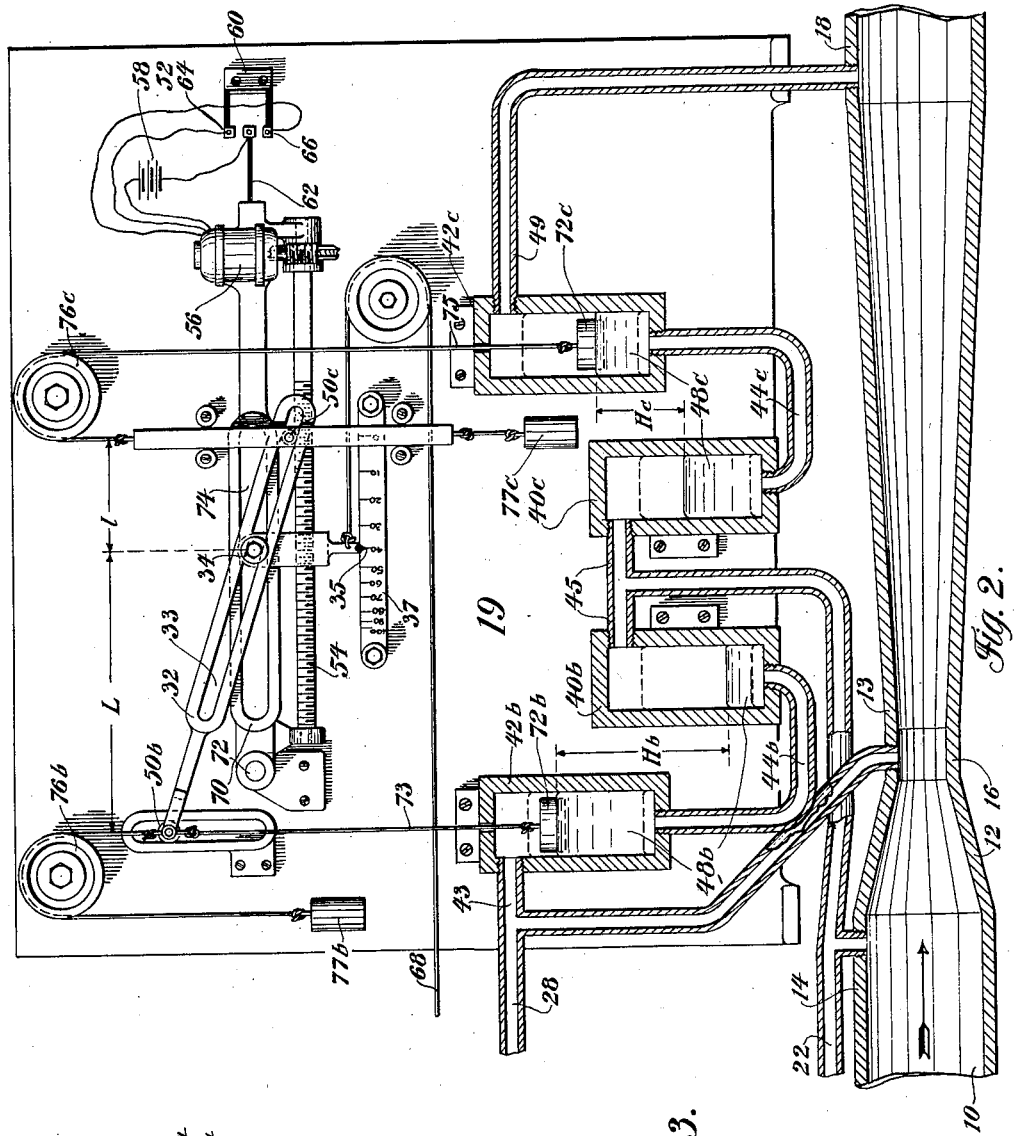
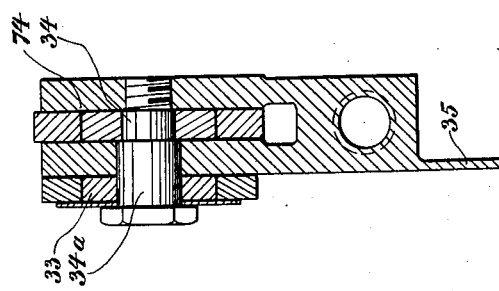
FREDERICK N. CONNET.
INVENTOR.
BY Thomas A. Jenckes Jr.
ATTORNEYS.

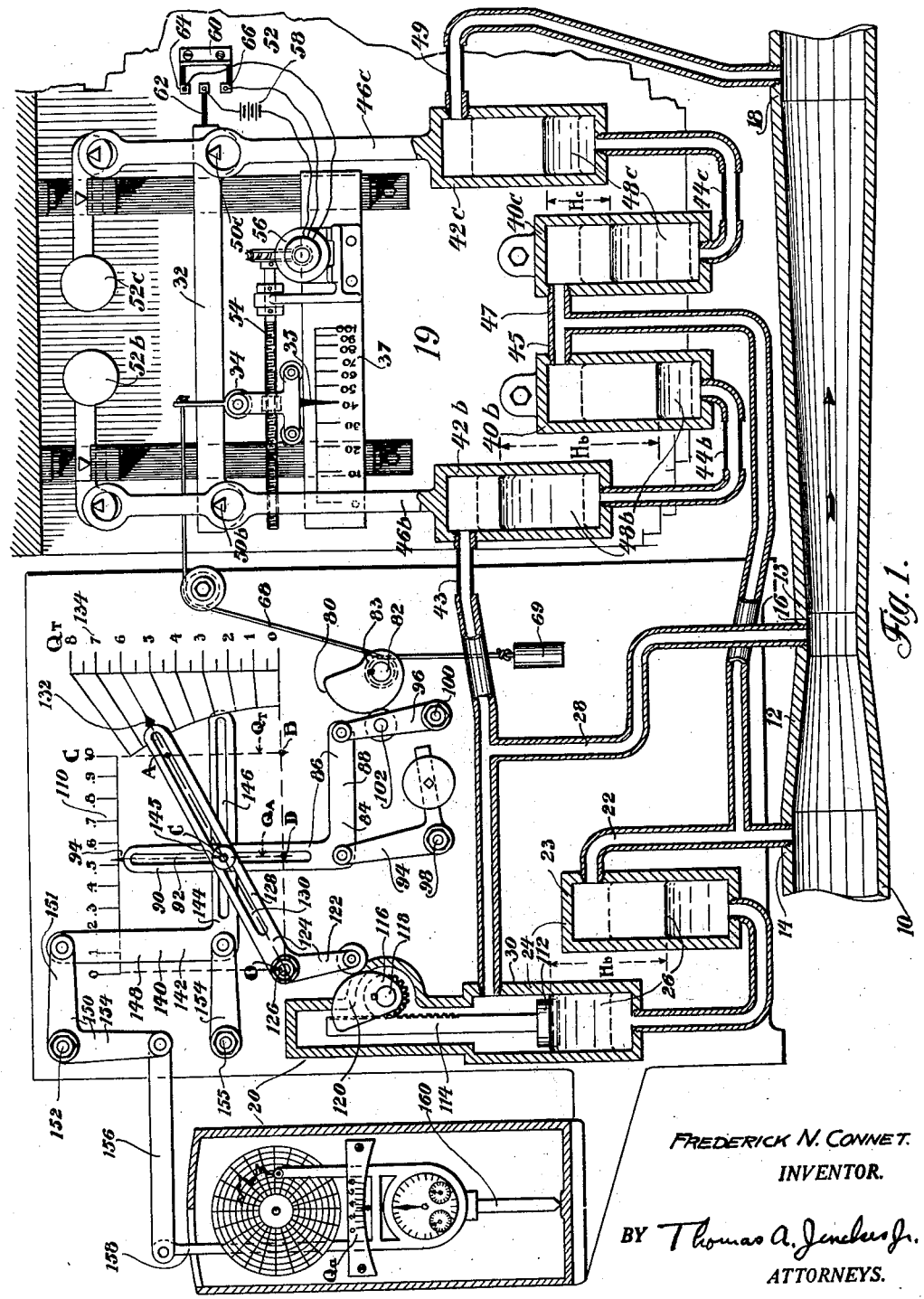

Patented Mar. 3, 1931

1,795,250

UNITED STATES PATENT OFFICE

FREDERICK N. CONNET, OF PROVIDENCE, RHODE ISLAND, ASSIGNOR TO BUILDERS IRON FOUNDRY, OF PROVIDENCE, RHODE ISLAND, A CORPORATION OF RHODE ISLAND

APPARATUS FOR OBTAINING THE RATIO BETWEEN TWO VARIABLES, PARTICULARLY ADAPTED FOR METERING VISCOUS FLUIDS

Application filed July 11, 1927. Serial No. 204,992.

My invention relates to an apparatus for and method of metering viscous fluids and includes in subcombination therewith an improved method of and apparatus for automatically obtaining the ratio between two variables, such as the ratio between the primary and auxiliary differentials produced in normally correcting the usual Venturi meter reading for viscosity in my improved method and apparatus.

The principles underlying my invention are explained in great detail in my Patent No. 1,586,948 issued June 1, 1926 and this application comprises an improved method and apparatus for automatically carrying out those principles by automatically causing the metering means to meter the correct rate of flow of a viscous fluid, preferably by means of a single recording arm. In employing the method employed in said application the operative must first observe the primary pressure differential and calculate the theoretical velocity of a perfectly mobile fluid and then observe an auxiliary differential, calculate the ratio auxiliary differential over the primary differential, refer to his tables, find the proper correction coefficient which corresponds to said ratio from the previously calibrated table and correct the theoretical rate of flow by said coefficient. Thus in actually metering the viscous fluid there is considerable work for the operative to do. The present invention is designed to do continuously all these things automatically and mechanically. As my improved device continuously, automatically corrects for viscosity, it is peculiarly useful in measuring flows wherein the viscosity and velocity vary quickly and considerably, for to do so accurately by an operative would consume the entire time of one operative and it would probably be impossible for the operative to continuously watch and record both differentials at once.

These and such other objects of my invention as may hereinafter appear will be best understood from a description of the accompanying drawings, which illustrate various embodiments thereof.

In the drawings, Fig. 1 is a diagrammatic view partially shown in section and partially in elevation of my improved device.

Fig. 2 is a diagrammatic view partially shown in section and partially shown in elevation of an alternative form of automatic ratio determining device employed in my complete apparatus.

Fig. 3 is a detailed sectional view of the adjustable fulcrum employed in the apparatus shown in Fig. 2.

In the drawings, wherein like characters of reference indicate like parts throughout, 10 generally indicates the conduit through which the viscous fluid flows. In order to meter the flow of fluid in said conduit, I provide means to meter the flow therein, preferably an inferential meter of the pressure differential responsive type. In my preferred embodiment said means includes means connected to a conduit to produce a primary pressure differential varying in a known manner with the rate of flow therein. In the embodiment shown said means comprises the portion 12 of converging sides of a Venturi meter tube 13 suitably connected to said conduit 10, said tube having the usual inlet 14, throat 16 and outlet 18.

I provide means 20 connected to said primary differential producing means 12 and actuated by the differential to meter the flow such as the meter 20 and I provide in addition thereto means for automatically correcting the reading of said metering means in accordance with the viscosity of the fluid flowing in said conduit 10. As in the application shown in my Patent 1,586,948, in order to produce a primary differential, I connect the inlet 14 by means of the pipe 22 to one leg 23 of a usual metering U tube 24 having an indicating liquid 26 therein and I suitably connect the throat 16 of the Venturi tube 13 by means of the pipe 28 to the opposite leg 30 of said U tube 24. The difference in levels between the indicating liquid in the legs 23 and 30 of the U tube 24 will indicate the observed Venturi head or the primary pressure differential.

As also stated in said Patent #1,586,948, I provide means to produce an auxiliary pressure differential differing from the primary pressure differential. Though any means for producing an auxiliary pressure differential connected to said conduit in proximity to the primary differential producing means may be used, in my preferred embodiment I employ the entire Venturi meter tube 13 from the inlet 14 to the outlet 18 thereof as said means. It is obvious that due to the skin friction and turbulence of the highly viscous fluid in flowing through the Venturi meter tube that there will be a loss in pressure or friction head between the inlet 14 and outlet 18 thereof and thus an auxiliary pressure differential or friction head created thereby.

As explained in said Patent #1,586,948 in actually metering the fluid therein, I first determine the ratio between the auxiliary pressure differential and the primary pressure differential or the ratio friction head $Hc$ over the Venturi head $Hb$. I provide for this purpose a ratio determining device 19, which automatically determines the ratio between the auxiliary and primary differentials and which may if desired be employed for determining the ratio between any two variables. While any suitable type of a device to accomplish this result may be employed, as shown I accomplish this by providing a beam 32, which rests on an automatically preferably horizontally adjustable fulcrum 34. Different portions of said beam 32 are acted upon in amounts proportionate to the differentials or the other variables, thus in my preferred embodiment in amounts proportionate to the primary differential $Hb$ and the auxiliary differential $Hc$. In the embodiment shown as an integral part of the apparatus shown in Fig. 1, I act on different portions of said beam 32 by means of weights or forces, whereas in the embodiment of my invention shown in Fig. 2, I act on said beam through the medium of distances. When the forces proportionate to said variables act respectively on different portions of said beam 32, I then automatically adjust the fulcrum 34 of said then unbalanced beam until said beam attains a condition of equilibrium. When this is attained, the position of the fulcrum 34 will then indicate the ratio between the variables.

As stated, in the embodiment shown in Fig. 1, I provide mechanical means to create forces proportionate to said differentials and to cause them to act on different portions of said beam. In said embodiment said mechanical means comprises for each differential a stationary reservoir 40b and 40c respectively and a movable reservoir 42b and 42c respectively connected to its respective stationary reservoir by the flexible pipes 44b and 44c respectively and to points 50b and 50c on said beam by the links 46b and 46c, said stationary reservoirs 40b and 40c, movable reservoirs 42b and 42c and connecting pipes 44b and 44c respectively having the indicating liquids 48b and 48c therein and being connected to the sources of pressure so that each pressure will act on the surface of indicating liquid in each reservoir and thus cause changes in each pressure differential to vary the net weight of movable reservoirs 42b and 42c proportionately to the differentials.

In the embodiment shown, in Fig. 1, the unit including the stationary reservoir 40b and movable reservoir 42b is connected to respond to the primary pressure differential or Venturi observed head, $Hb$, to cause the surface of the indicating liquid 48b in the movable reservoir 42b to move proportionately to the differential and I thus connect the throat 16 of the Venturi meter tube to the movable reservoir 42b above the level of the indicating liquid 48b therein by means of the flexible pipe 43 and I connect the inlet 14 of the meter tube 13 by means of the pipe 45 to the stationary reservoir 40b above the normal level of the liquid 48b therein. If the sides of the reservoir are made transparent the difference in level of the indicating fluid 48b in the reservoirs 40b and 42b will indicate the primary pressure differential or $Hb$. The counterweights 52b and 52c are provided to balance the movable reservoirs 42b and 42c so that the net weight of indicating fluid 48b and 48c in the movable reservoirs 42b and 42c will vary proportionately with the pressure differentials.

The unit including the movable and stationary reservoirs 40c and 42c is adapted to indicate the auxiliary pressure differential or friction head and the liquid in the movable reservoir 42c to move proportionate to variations thereof. To this end I connect the inlet 14 of the Venturi meter tube to the stationary reservoir 40c above the normal level of the indicating liquid therein by means of the pipe 47 and I connect the outlet of said Venturi meter tube to the movable reservoir 42c above the normal level of the liquid 48c therein by means of the flexible pipe 49. The difference in level of the fluid 48c in the movable reservoir 42c from that in the stationary reservoir 40c thus responds to the friction head $Hc$ or auxiliary pressure differential and it is obvious that the surface of the liquid 48c in the movable reservoir 42c will move in proportion to changes in the auxiliary pressure differential. It is thus obvious that by varying the weights of the reservoirs 42b and 42c respectively, I have created forces acting upon the beam 32 through the medium of the points 50b and 50c which vary proportionately to the differentials or to the variables employed. Thus as the reservoirs 42b and 42c act on said beam 32 with variable force it is obvious that the beam 32 will become unbalanced. As stated I provide means 52 to automatically adjust the fulcrum of the unbalanced beam 32 until said beam attains a condition of equilibrium, whereby the position of said fulcrum 34 may indicate the ratio between the two variables, thus in my preferred embodiment between the auxiliary and primary differentials or the ratio $Hc/Hb$. While any suitable means for adjusting the fulcrum 34 until the beam attains a state of equilibrium may be employed, I preferably employ a horizontally extending shaft 54 threadedly connected to the fulcrum 34 and a suitable motor 56 to revolve said threaded shaft, means 58 to actuate said motor and means 60 actuated by said beam 32 when in an unbalanced state to actuate said means 58 to actuate said motor 56 to rotate said threaded shaft 54 to move said fulcrum 34 until said beam 32 attains a state of equilibrium. While any type of motor 56 may be employed, I preferably employ the electric motor 56 and a suitable source of electricity 58 to actuate said motor. As my preferred embodiment of means 60, in the embodiment shown in Fig. 1 I preferably provide the contact arm 62 connected to the source of electricity and projecting from said beam 32 and the contacts 64 and 66 connected to said source of electricity through said motor spaced at opposite sides of said contact arm 62. When said beam 32 is unbalanced the contact arm 62 is in contact with either the contact 64 or 66. When the arm 62 is in contact with the contact 64 the connections are such that the fulcrum 34 will be moved toward the fulcrum point 50$b$ to place the beam 32 in a state of equilibrium and when the contact arm 62 is in contact with the contact 66 the connections are such that the fulcrum 34 will be moved in the opposite direction towards the fulcrum point 50$c$ until the beam 32 attains a state of equilibrium. The fulcrum 34 is provided with the pointer 35 which moves over the scale 37 extending underneath said beam 32 to between the fulcrum points 50$b$ and 50$c$ thereof which is calibrated to indicate the ratio. If desired as will be apparent the fulcrum 34 may be connected with other means, such as by the cord 68 to actuate other mechanism in accordance with changes in the ratio of the variables.

In Figs. 2 and 3 I show a different embodiment of my device for automatically obtaining the ratio between two variables, based on the same principles such as the auxiliary pressure differential $Hc$ and the primary pressure differential $Hb$, which is adapted to function through the medium of distances rather than through the medium of forces. In this case a longitudinally slotted lever 70 is provided with a suitably fulcrumed end 72, a longitudinal slot 74 and a contact arm 62 on the opposite end thereof from the fulcrum. The beam 32 is also longitudinally slotted as at 33 and the fulcrum 34 is provided with the fulcrum pin 34$a$ which slides in the slots 33 and 74 respectively. The reservoirs 42$b$ and 42$c$ are immovably connected to the stationary reservoirs 40$b$ and 40$c$ and the floats 72$b$ and 72$c$ laid on the surface of the indicating liquids 48$b$ and 48$c$ in said reservoirs 42$l$ and 42$c$. The float 72$b$ is connected through the medium of the cord 73 to the point 50$b$ on said beam 32, after which it may be hooked over the pulley 76$b$ and have the counterweight 77$b$ connected to the end thereof, and the float 72$c$ is connected through the medium of the flexible cord 75 looped over the pulley 76$c$ to the point 50$c$ on said beam 32, and having the counterweight 77$c$ connected to the end thereof. When the floats 72$b$ and 72$c$ thus act on the beam 32, the lever 70 is thrown out of equilibrium forming a contact either with the contact 64 or 66 to complete a circuit to cause the source of electricity 58 to actuate the motor 56 to move the threaded shaft 54, to move the fulcrum 34 by means of its threaded connection therewith, which fulcrum 34 thus slides longitudinally of the slot 74 in the lever 70 to adjust the fulcrum 34 until the contact arm 62 is intermediate the contacts 64 and 66 and the beam 32 is in equilibrium. In this case the distance 1, the horizontal projection of the portion of said beam between the point 50$c$ and fulcrum 34 on said horizontal lever 70 will vary as the auxiliary pressure differential or friction head $Hc$ and the distance L of the horizontal projection of the portion of the beam between the point 50$b$ and the fulcrum 34 on the lever 70 will vary as the primary pressure differential or Venturi head $Hb$ and the position of the fulcrum 34 and pointer 35 on the scale 37 will indicate the ratio of the auxiliary pressure differential to the primary pressure differential or the ratio $Hc/Hb$ which varies as $1/L$.

As stated in my Patent #1,586,948 I have discovered that the correction coefficient to be applied in the usual Venturi formula to correct it for the viscosity and velocity of the fluid flowing therethrough varies as the ratio between the auxiliary and primary pressure differentials and as stated in said patent, it is possible to determine the relationship by calibration. After said relationship has been determined it is possible to construct a cam in accordance with variations in said coefficient and as this cam 80 may cause a movable element 84 to move, said cam may be connected to an element such as the movable fulcrum 34 by means of the cord 68 to cause said movable element 84 to come in contact with said cam 80 and to move according to variations in the ratio between said differentials and a scale may be provided for said movable element 84 calibrated in line with said correction coefficients. To this end I provide the cam 80, constructed in accordance with the calibrated curve of the correction coefficients, which is suitably pivoted on my apparatus by the pivot pin 82 adjacent to the movable element 84. The movable element 84 includes an indicating member 86 provided with a horizontally extended base 88 and the indicating arm 90 vertically slotted as at 92 and provided with the indicating finger 94 projecting upwards at right angles therefrom and the two parallel links 94 and 96 suitably pivoted at 98 and 100 and having their upper ends joined to opposite ends of the base 88 of the indicating member 86. The movable element 84 is thus constructed so that the indicating arm 90 may project vertically and move sidewise in a substantially horizontal line. The link 96 is provided with the pin 102 adapted to be contacted by the cam 80 to move the indicating element sidewise on contact therewith. The cam 80 is suitably revolved in one direction by the cord 68 pulled by the adjustable fulcrum 34 and in the opposite direction by the counterweight 69, said cord 68 being looped around the sleeve 83 projecting from said cam 80 over said pin 82. I provide the scale 110 suitably calibrated for correction coefficients over which the indicating pointer 94 may travel. It is thus obvious that the indicating arm 90 of the indicating member 94 moves sidewise to indicate the corresponding correction coefficients in proportion to the movement of the fulcrum 34 which varies with variations in the ratio of the auxiliary differential over the primary differential or friction head over theoretical Venturi head.

The metering device 20 as stated includes the leg 30 of the U tube 24 in which rides the float 112 on the surface of the indicating liquid 26 therein, which reciprocates the rack 114, which through the medium of the gear 116 rotates the shaft 118 to rotate the cam 120 which contacts the short arm 122 of an indicating lever 124 suitably pivoted at 126 or point O and provided with a long indicating arm 128 longitudinally slotted as at 130 and provided with the indicating finger 132 which travels over and registers on the vertically extending scale 134 graduated in proportion to the square root of the mercury indicating fluid differential to indicate the theoretical rate of flow of a perfectly mobile fluid, as evidenced by the primary pressure differential produced. The indicating finger 132 by its position on the scale 134 thus indicates the theoretical velocity of a perfectly mobile fluid flowing through the conduit 10. It is thus obvious that the indicating finger 132 forms a movable element connected to the primary pressure differential producing means, which moves in proportion to and indicates the theoretical rate of flow of a perfectly mobile fluid flowing through said conduit and that the indicating finger 94 forms another element movable in accordance with the variations in the velocity correction coefficients varying in a known and calibrated manner with the ratio between the auxiliary pressure differential and the primary pressure differential and connected to and actuated by said ratio determining device.

I provide suitable means to multiply the movements of said elements to cause a third element 140 to move in response to variation in the product of said movable elements 94 and 132. In my preferred embodiment said third element comprises the movable element 140, which comprises the vertically movable element 142, which comprises the horizontally extending base 144 provided with the longitudinal slot 146 and the arm 148 extending vertically from one end thereof, said element 140 having the lower end of the vertical arm 142 thereof pivoted to a link 154 suitably pivoted on the pivot pin 155 that the member 140 may always move in a vertical direction. The upper end of the vertical arm 142 is pivotally connected to the substantially horizontal arm 151 of a bell crank lever 150 suitably pivoted as at 152 and having the arm 154 projecting downwards from said pivot point at right angles to said horizontally extending long arm, said downwardly projecting arm being pivotally connected by means of the link 156 to the arm 158 projecting upwards from the usual pivoted lever 160 of a standard register indicator recorder so as to move said projecting link 156 laterally in proportion to the vertical movement of the third movable element 140 which moves according to the product of the movement of the movable members 94 and 132. Former standard register indicator recorders have had their pivoted lever 160 moved directly sidewise in proportion to variations in the rate of flow by the cam 120 revolved by the rack 114 on variations of the height of indicating liquid 26 in the U tube 24 and I have thus modified the standard type of register indicator recorder by interposing between said cam 120 and pivoted lever 160 the multiplying mechanism which functions in a manner to be explained. The pin 145 projects through the slot 92 in the vertically extending arm 90 of the member 84 movable horizontally in accordance with the variation in the correction coefficient and also projects through the longitudinal slot 130 in the arm 128 of the movable lever 124 which moves angularly according to the theoretical rate of flow of a perfect mobile fluid.

The multiplying device thus functions on the principle of similar triangles. The theoretical rate of flow $Qt$ of a perfectly mobile fluid is indicated by the vertical movement A B of the pointer 132. The horizontal distance O B of point A of the pointer 132 from the pin 126 corresponds with a coefficient of 1.00 or unity. Due however to the changes of the aforedescribed ratio of primary pressure differential over the auxiliary pressure differential the vertically extending arm 90 moves horizontally to the left over the scale 110 from the position of unity on the right so that the distance O D of its center is an amount O D proportionate to the proper correction coefficient C causing a movement of the pivot pin 145 to the left and a corresponding decrease in the distance C D which the pin 145 is raised above the horizontal base line O B. The distance A B thus indicates the quantity of flow $Qt$ of a perfectly mobile fluid, and due to the multiplying effect of the movable element 84 the distance C D represents the actual quantity $Qa$ which as previously stated is equal to the theoretical quantity $Qt$ multiplied by the correction coefficient C. The following simple relationship obviously holds: C D/A B is equal to O D/O B; and is equal to C/1.00; and is equal to $Qa/Qt$. The vertical movement of this third movable member 140 through the link 156 will be converted into a horizontal movement of the arm 158 of the lever 160 pivoted as usual in the recorder and it is obvious that the movement of said recorder over 158 will thus be corrected for viscosity effects to indicate the actual rate of fluid flowing through the conduit 10.

It is understood that my invention is not limited to the specific embodiments shown or methods described and that various deviations may be made therefrom without departing from the spirit and scope of the appended claims.

What I claim as new and desire to secure by Letters Patent is:

1. An inferential meter of the pressure differential responsive type for indicating the flow of a viscous fluid in a conduit, comprising, in combination, means connected to a conduit to produce a primary pressure differential varying in a known manner with the rate of flow therein, means connected to said means and actuated by said differential to meter the theoretical flow and means for automatically correcting said metering means in accordance with the viscosity of said viscous fluid to make said means meter the actual flow.

2. An inferential meter of the pressure differential responsive type for indicating the flow of a viscous fluid in a conduit comprising, in combination, means connected to a conduit to produce a primary pressure differential varying in a known manner with the rate of flow therein, means connected to said means and actuated by said differential to meter the flow, means to produce an auxiliary pressure differential differing from the primary differential, an automatic differential ratio determining device for determining the ratio between the auxiliary and primary differentials and means connected thereto and actuated thereby for automatically correcting said metering means in accordance with variations in said ratio to make said means meter the actual flow, said pressure differential producing means being so connected to said conduit that each is actuated upon by the entire flow through said conduit to produce its respective differential.

3. An inferential meter of the pressure differential responsive type for indicating the flow of a viscous fluid in a conduit comprising in combination, means connected to a conduit to produce a primary pressure differential varying in a known manner with the rate of flow therein, means connected to said means and actuated by said differential to meter the flow, means to produce an auxiliary pressure differential differing from the primary differential, an automatic differential ratio determining device for determining the ratio between the auxiliary and primary differentials and means connected thereto and actuated thereby for automatically correcting said metering means in accordance with variations in said ratio including means for multiplying the primary metering reading by viscosity correction coefficients varying in a known previously calibrated manner with said ratio to make said means meter the actual flow, said pressure differential producing means being so connected to said conduit that each is acted upon by the entire flow through said conduit to produce its respective differential.

4. An inferential meter of the pressure differential responsive type for indicating the flow of a viscous fluid in a conduit, comprising in combination means connected to a conduit to produce a primary pressure differential varying in a known manner with the rate of flow therein, a movable element connected to said means and actuated by said differential to indicate the theoretical velocity of a perfectly mobile fluid flowing through said conduit, means to produce an auxiliary pressure differential differing from the primary differential, an automatic differential ratio determining device for determining the ratio between the auxiliary and primary differentials and means connected thereto and actuated thereby for automatically correcting said metering means in accordance with variations in said ratio including a multiplying device comprising said movable element and another element moving in accordance with variations in viscosity correction coefficients varying in a known and calibrated manner with said ratio and connected to and actuated by said ratio determining device and a third element movable in response to variations in the product of said movable elements and means for indicating the movement of said third element to make said means meter the actual flow, said pressure differential producing means being so connected to said conduit that each is acted upon by the entire flow through said conduit to produce its respective differential.

5. The method of metering in an inferential meter of the pressure differential responsive type the flow of viscous fluids in a conduit which comprises metering said fluid in the usual manner, finding the observed metering head of said fluid, finding the friction head of said fluid and automatically correcting said metering for viscosity by an amount previously determined by calibration varying proportionately with the ratio of friction head over observed metering head.

6. A device for controlling the movement of a member responsive to a variable comprising a member movable in response to said variable, means for automatically obtaining the ratio between two variables, means to transmit the movement of said primary movable member to said controlled member and means controlled by said ratio determining means acting on said transmitting means to vary the transmittal of movement thereof in accordance with a function of said ratio.

7. A device for controlling the movement of a member responsive to a primary variable, comprising a primary member movable in response to said primary variable, means for automatically obtaining the ratio between said primary variable and another variable, means to transmit the movement of said primary movable member to said controlled member and means controlled by said ratio determining means acting on said transmitting means to vary the transmittal of movement thereof in accordance with a function of said ratio.

8. A device for automatically obtaining the ratio between two variables comprising, a beam, a fulcrum for said beam, a horizontally extending shaft threadedly connected to said fulcrum, means to act on different portions of said beam in amounts proportionate to said variables, a motor to revolve said threaded shaft, means to actuate said motor and means actuated by said beam when in an unbalanced state to actuate said means to actuate said motor to rotate said shaft to move said fulcrum until said beam attains a condition of equilibrium.

9. A device for automatically obtaining the ratio between two variables comprising a beam, a fulcrum for said beam, a horizontally extending shaft threadedly connected to said fulcrum, means to act on different portions of said beam in amounts proportionate to said variables, a motor to revolve said threaded shaft, a source of electricity to actuate said motor, a contact arm projecting from said beam and contacts spaced at opposite sides of said contact arm and connected to said source of electricity adapted to contact said contact arm to complete a circuit to actuate said motor to rotate said shaft to move said fulcrum until said beam attains a condition of equilibrium, each contact being so connected as to move said fulcrum in opposite directions.

10. A device for automatically obtaining the ratio between two variables, comprising a beam, a fulcrum for said beam, means to create forces proportionate to said variables and to cause them to act on different portions of said beam and means actuated directly by said beam on an unbalanced condition thereof to automatically adjust the fulcrum of said beam until said beam attains a condition of equilibrium, whereby the position of said fulcrum may indicate the ratio between said variables.

11. An automatic differential ratio determining device comprising a beam, a fulcrum for said beam, mechanical means to create forces proportionate to said differentials and to cause them to act on different portions of said beam comprising for each differential a stationary reservoir, a movable reservoir connected thereto and to a point on said beam, said reservoirs having liquid therein and being connected to the sources of differential pressure so that each pressure will act on the surface of liquid in each reservoir and thus cause changes in each pressure differential to vary the weight of each movable reservoir and means to automatically adjust the fulcrum of said unbalanced beam until said beam attains a condition of equilibrium, whereby the position of said fulcrum may indicate the ratio between said differentials.

12. An inferential meter of the pressure differential responsive type for indicating the flow of a viscous fluid in a conduit, comprising in combination, means connected to a conduit to produce a primary pressure differential varying in a known manner with the rate of flow therein, means connected to said means and actuated by said primary differential to meter the flow, means connected to said conduit to produce an auxiliary pressure differential varying in a known manner with the rate of flow therein and differing from the primary differential and means connected to said primary and auxiliary pressure producing means actuated by said differentials for automatically correcting said metering means in accordance with the viscosity of said viscous fluid to make said means meter the actual flow, said pressure differential producing means being so connected to said conduit that each is acted upon by the entire flow through said conduit to produce its respective differential.

13. An inferential meter of the pressure differential responsive type for indicating the flow of a viscous fluid in a conduit, comprising in combination, means connected to a conduit to produce a primary pressure differential varying in a known manner with the rate of flow therein, means having a single movable recording arm connected to said means and actuated by said differential to meter the theoretical flow through the movement of said recording arm and means for automatically correcting said metering means in accordance with the viscosity of the fluid to make said recording arm record the actual fllow.

14. A device for controlling the movement of a member responsive to a variable comprising a primary member movable in response to said variable, means for automatically obtaining the ratio between two variables, including a beam, a fulcrum for said beam, means to act on different portions of said beam in amounts proportionate to said variables, means to automatically adjust the fulcrum of said unbalanced beam until said beam attains a condition of equilibrium, whereby the position of said fulcrum may indicate the ratio between said variables, means to transmit the movement of said primary movable member to said controlled member and means connected to said fulcrum and thus controlled by said ratio to act on said transmitting means to vary the transmittal of movement thereof in accordance with a function of said ratio.

15. A device for automatically continuously obtaining the ratio between two variables comprising a beam, a fulcrum for said beam, means to create forces proportionate to said variables and to cause them to act on different portions of said beam and means to automatically adjust the fulcrum of said beam until said beam attains a condition of equilibrium, a pointer directly actuated by said fulcrum and a ratio indicating scale adjacent said fulcrum, whereby the position of said fulcrum and hence pointer may directly indicate on said scale the ratio between said variables.

In testimony whereof I affix my signature.

FREDERICK N. CONNET.